(12) United States Patent
Cho et al.

(10) Patent No.: US 8,584,043 B2
(45) Date of Patent: Nov. 12, 2013

(54) MOBILE TERMINAL INCLUDING TOUCH SCREEN AND METHOD OF CONTROLLING OPERATION THEREOF

(75) Inventors: Hang Jun Cho, Seoul (KR); Min Joo Kim, Seoul (KR); Jeong Hyuk Yoon, Seoul (KR); Yoon Hwan Kang, Seoul (KR); Sang Hyun Lee, Seoul (KR); Min Soo Park, Seoul (KR); Hyo Jin Suh, Seoul (KR); Hye Youn Cho, Seoul (KR); Hye Eun Shin, Seoul (KR); Se Il Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 12/209,827

(22) Filed: Sep. 12, 2008

(65) Prior Publication Data

US 2009/0077497 A1    Mar. 19, 2009

(30) Foreign Application Priority Data

Sep. 18, 2007   (KR) ......................... 10-2007-0094834

(51) Int. Cl.
   *G06F 3/048*   (2013.01)

(52) U.S. Cl.
   USPC .......................................... 715/838; 715/814

(58) Field of Classification Search
   USPC .................................. 715/814, 838
   See application file for complete search history.

(56) References Cited

U.S. PATENT DOCUMENTS

| | | | |
|---|---|---|---|
| 7,546,543 B2 * | 6/2009 | Louch et al. | 715/762 |
| 2002/0054056 A1 * | 5/2002 | Ozawa et al. | 345/700 |
| 2004/0141010 A1 | 7/2004 | Fitzmaurice et al. | |
| 2005/0034084 A1 * | 2/2005 | Ohtsuki et al. | 715/864 |
| 2006/0004685 A1 * | 1/2006 | Pyhalammi et al. | 707/1 |
| 2006/0010394 A1 | 1/2006 | Chaudhri et al. | |
| 2006/0129948 A1 * | 6/2006 | Hamzy et al. | 715/790 |
| 2006/0156228 A1 * | 7/2006 | Gallo et al. | 715/523 |
| 2008/0034316 A1 * | 2/2008 | Thoresson | 715/781 |
| 2008/0052945 A1 * | 3/2008 | Matas et al. | 34/173 |
| 2008/0062141 A1 * | 3/2008 | Chandhri | 345/173 |
| 2008/0163053 A1 * | 7/2008 | Hwang et al. | 715/702 |
| 2009/0058822 A1 * | 3/2009 | Chaudhri | 345/173 |

FOREIGN PATENT DOCUMENTS

| | | |
|---|---|---|
| KR | 10-2002-0082510 A | 10/2002 |
| KR | 10-2007-0080918 A | 8/2007 |
| WO | WO 2005/067511 A2 | 7/2005 |

\* cited by examiner

*Primary Examiner* — Omar Abdul-Ali
*Assistant Examiner* — Anil Bhargava
(74) *Attorney, Agent, or Firm* — Birch, Stewart, Kolasch & Birch, LLP

(57) ABSTRACT

A mobile terminal including a touch screen and a method of controlling an operation thereof are provided. The method of controlling an operation of a mobile terminal includes: displaying a thumbnail image corresponding to an image file on a touch screen to be randomly overlapped; selecting any one of thumbnail images by touch input; and displaying the selected thumbnail image together with an option icon for selecting a quick menu to be distinguished from other thumbnail images. Therefore, a list of stored image files can display thumbnail images in a new arrangement manner and it possible to quickly enter a related menu from the thumbnail image.

20 Claims, 14 Drawing Sheets

MOBILE TERMINAL INCLUDING TOUCH SCREEN AND METHOD OF CONTROLLING OPERATION THEREOF

CROSS-REFERENCE TO RELATED APPLICATION

This application claims the benefit of Korean Application No. 2007-0094834, filed on Sep. 18, 2007 in the Korean Intellectual Property Office, the disclosure of which is incorporated herein by reference.

BACKGROUND OF THE INVENTION

1. Field of the Invention

The present invention relates to a mobile terminal equipped with a touch screen, and a method and computer program product for controlling an operation thereof, that can display a thumbnail image corresponding to a stored image file in a new arrangement manner and that can quickly enter a related menu.

2. Description of the Related Art

A conventional mobile terminal is a portable appliance that can be carried and that has at least one of a function of performing audio and/or audiovisual communication, a function of inputting and outputting information, and a function of storing data. As the function of the mobile terminal have become more diversified, the conventional mobile terminal has been equipped with more complicated functions such as photographing of a picture or taking a moving picture, reproducing of a music file, still image file or a moving picture file, playing a game, receiving a broadcast, and wirelessly communicating with the Internet or another network. Such conventional mobile terminals may include a multimedia player function.

In order to accommodate the various functions added to mobile terminals, various hardware or software improvements have been considered. As an example, user interface (UI) environment improvements have been considered so as to enable a user to easily and conveniently search for or select a function of the mobile terminal. Furthermore, attempts have been made to provide features that allow a user to personalize their devices.

Furthermore, as the functions of the mobile terminal grow and as storage capacity thereof increases, picture quality of an image file that can be reproduced in the mobile terminal have greatly improved, and the quantity of stored image files also has increased. Accordingly, the user of a conventional device can use image files stored in the mobile terminal in various ways. For example, conventional devices allow a user to edit san image file and to then transmit the edited image file as an attachment to some communication, or to set the original or edited image file as a background image on a screen.

However, when a list viewing menu of the image files stored in the conventional mobile terminal is selected, it is common that a thumbnail image corresponding to the stored image file is displayed in a matrix form. Furthermore, many key strokes are needed in the conventional device in order to select any one of the displayed thumbnail images, to edit the selected thumbnail image and/or to transmit the selected thumbnail image. The complexity of the conventional devices impedes consumer use and acceptance of the conventional devices.

SUMMARY OF THE INVENTION

The present invention has been made in an effort to solve the above problems. The present invention provides a mobile terminal, and a corresponding method and computer program product for controlling an operation thereof, that can display a list of stored image files in a user friendly manner and that can allows a user to quickly and easily access a related menu in the displayed image list.

According to an aspect of the present invention, there is provided a method and computer program product for controlling an operation of a mobile terminal including: displaying a thumbnail image corresponding to an image file stored in a touch screen to be randomly overlapped; selecting any one of thumbnail images by touch input; and displaying the selected thumbnail image together with an option icon for selecting a quick menu to be distinguished from other thumbnail images.

The method may further include displaying a quick menu item of a rear surface by turning over the selected thumbnail image, when the option icon is selected by touch input.

The method may further include displaying a corresponding image file on a full screen, when an image display area of the selected thumbnail image is selected by touch input.

According to an aspect of the present invention, there is provided a mobile terminal including: a display unit for displaying a thumbnail image to be randomly overlapped; and a controller for controlling, when any one of thumbnail images is selected, to display the selected thumbnail image together with an option icon for selecting a quick menu in the display unit to be distinguished from other thumbnail images.

According to another aspect of the present invention, there is provided a computer readable recording medium on which a program for executing the method in the computer is recorded.

BRIEF DESCRIPTION OF THE DRAWING

The present invention will become more fully understood from the detailed description given herein below and the accompanying drawings, which are given by illustration only, and thus are not limitative of the present invention, and wherein.

DETAILED DESCRIPTION OF THE INVENTION

Hereinafter, exemplary embodiments according to the present invention will be described in detail with reference to the accompanying drawings.

A mobile terminal described in a present specification includes a mobile phone, a smart phone, a notebook computer, a digital broadcasting terminal, personal digital assistants (PDA), a portable multimedia player (PMP), and a navigation apparatus.

Figure 1:
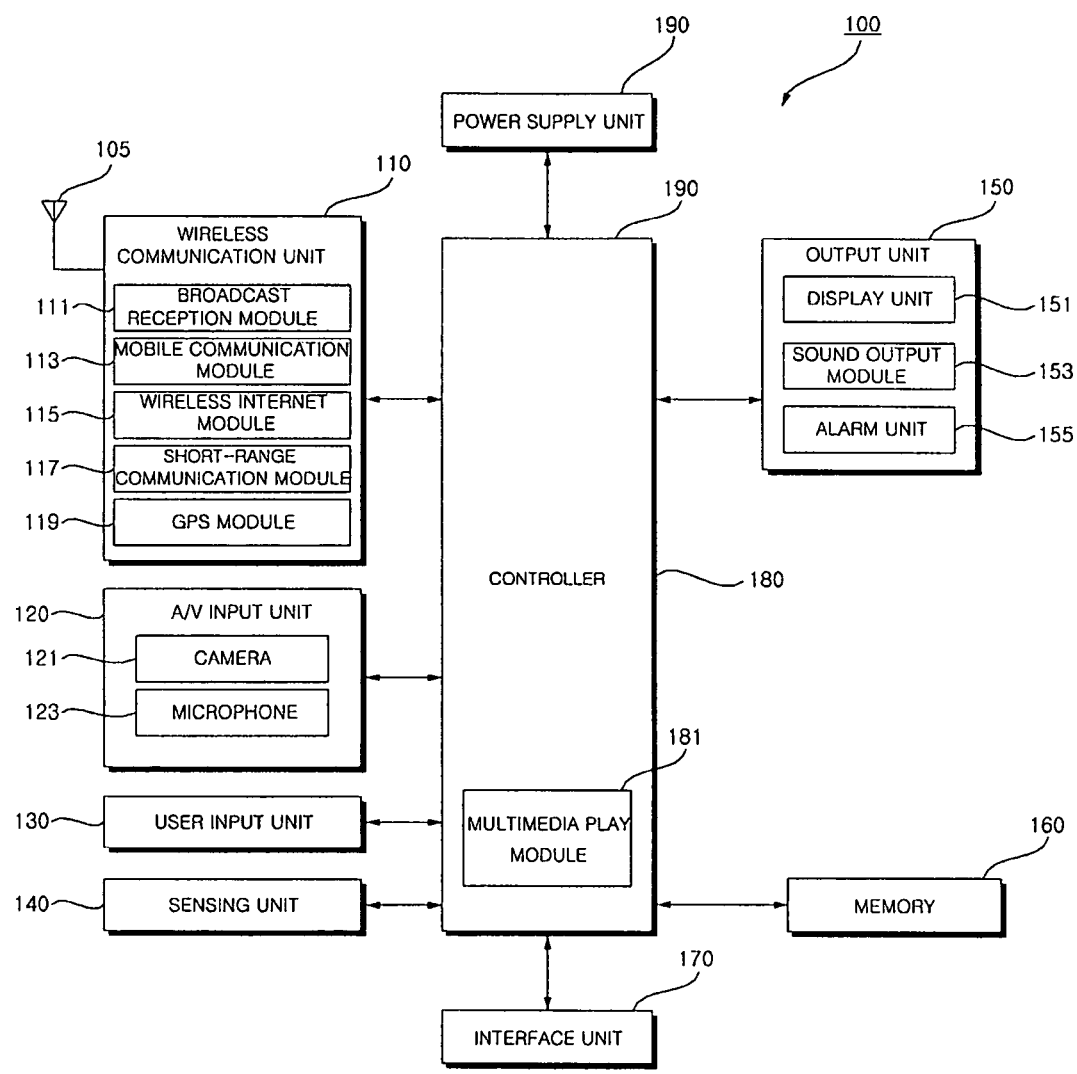
FIG. 1 is a block diagram of a mobile terminal according to an exemplary embodiment of the present invention.

FIG. 1 is a block diagram of a mobile terminal according to an exemplary embodiment of the present invention. Referring to FIG. 1, the mobile terminal according to an exemplary embodiment of the present invention is described in an element viewpoint according to a function thereof.

Referring to FIG. 1, the mobile terminal 100 includes a radio frequency (RF) unit 110, an audio/video (A/V) input unit 120, a user input unit 130, a sensing unit 140, an output unit 150, a memory 160, an interface unit 170, a controller 180, and a power supply unit 190. When such elements are actually embodied, two or more elements are combined into one component or one component is subdivided into two or more elements, as needed.

The RF unit 110 may include a broadcasting reception module 111, a mobile communication module 113, a wireless Internet module 115, a local area communication module 117, and a Global Positioning System (GPS) module 119.

The broadcasting reception module 111 receives at least one of a broadcasting signal and broadcasting related information from an external broadcasting management server through a broadcasting channel. In this case, the broadcasting channel may include a satellite channel and a terrestrial channel. The broadcasting management server is a server for generating and transmitting at least one of a broadcasting signal and broadcasting related information or a server for receiving at least one of the generated broadcasting signal and broadcasting related information to transmit the at least one of the generated broadcasting signal and broadcasting related information to the mobile terminal.

The broadcasting related information is information related to a broadcasting channel, a broadcasting program or a broadcasting service provider. The broadcasting signal may include a TV broadcasting signal, a radio broadcasting signal, a data broadcasting signal, and a broadcasting signal of a form in which a data broadcasting signal is combined to the TV broadcasting signal or the radio broadcasting signal. The broadcasting related information may be provided even through a mobile communication network and in this case, may be received by the mobile communication module 113. The broadcasting related information may exist in various forms. For example, the broadcasting related information may exist in a form such as Electronic Program Guide (EPG) of Digital Multimedia Broadcasting (DMB) or Electronic Service Guide (ESG) of Digital Video Broadcast-Handheld (DVB-H).

The broadcasting reception module 111 receives a broadcasting signal using various broadcasting systems and can receive a digital broadcasting signal using a digital broadcasting system such as particularly, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). Further, the broadcasting reception module 111 can be formed to be suitable to all broadcasting systems for providing a broadcasting signal as well as such a digital broadcasting system. A broadcasting signal and/or broadcasting related information received through the broadcasting reception module 111 can be stored in the memory 160.

The mobile communication module 113 transmits and receives a radio signal to and from at least one of a base station, an external terminal, and a server in a mobile communication network. Here, the radio signal may include various forms of data according to transmission and reception of an audio dedicated communication call signal, an audiovisual communication call signal, or a character/multimedia message.

The wireless Internet module 115 is a module for connecting to wireless Internet and may be provided at the inside or the outside of the mobile terminal 100. The local area communication module 117 is a module for local area communication. As local area communication technology, Bluetooth, Radio Frequency Identification (RFID), infrared Data Association (IrDA), Ultra Wideband (UWB), and ZigBee, etc. can be used. The GPS module 119 receives position information from a plurality of GPS artificial satellites.

The A/V input unit 120 is used for inputting an audio signal or a video signal and may include a camera 121 and a microphone 123. The camera 121 processes an image frame of a still image or a moving image obtained by an image sensor in an audiovisual communication mode or a photographing mode. The processed image frame can be displayed in the display unit 151.

The image frame processed in the camera 121 may be stored in the memory 160 or transmitted to the outside through the RF unit 110. According to a configuration aspect of the mobile terminal, two or more cameras 121 may be provided in the mobile terminal.

In a communication mode or a recording mode, and a sound recognition mode, the microphone 123 receives an external sound signal to process to electrical sound data. In a communication mode, the processed sound data are converted to a form that can be transmitted to a mobile communication base station through the mobile communication module 113 and are output. The microphone 123 can use various noise removal algorithms for removing noise generating in a process of receiving an external sound signal.

The user input unit 130 generates key input data in which a user inputs in order to control an operation of the mobile terminal. The user input unit 130 may include a keypad, a dome switch, a touch pad (static pressure/static electricity), a jog wheel, a jog switch, a finger mouse, etc. Particularly, when the touch pad and the display unit 151 to be described later are formed in a layer structure, they are called a touch screen.

The sensing unit 140 generates a sensing signal for controlling an operation of the mobile terminal 100 by detecting a current state of the mobile terminal 100 such as an opening or closing state of the mobile terminal 100, a position of the mobile terminal 100, and whether a user touches the mobile terminal 100. For example, when the mobile terminal 100 is formed in a slide phone type, the sensing unit 140 can sense whether the slide phone is opened or closed. Further, the sensing unit 140 can perform a function of sensing whether power is applied to the power supply unit 190 and whether the interface unit 170 is coupled to an external appliance.

The output unit 150 outputs an audio signal, a video signal, or an alarm signal and may include a display unit 151, a sound output module 153, and an alarm unit 155.

The display unit 151 displays information processed in the mobile terminal 100. For example, when the mobile terminal 100 is in a communication mode, the mobile terminal 100 displays a user interface (UI) or a graphic user interface (GUI) related to communication. When the mobile terminal 100 is in an audiovisual communication mode or a photographing mode, the mobile terminal 100 can display each or both of a photographed image and a received image and displays the UI and the GUI.

As described above, when the display unit 151 and the touch pad form a touch screen in a layer structure, the display unit 151 can be used as an input device in addition to an output device. When the display unit 151 is formed with the touch screen, the display unit 151 may include a touch screen panel and a touch screen panel controller. In this case, the touch screen panel is a transparent panel attached to the outside and can be connected to a bus within the mobile terminal. When touch input is generated through a contact result, the touch screen panel sends the corresponding signals to the touch screen panel controller. The touch screen panel controller processes the signals and then transmits the corresponding data to the controller 180, thereby allowing the controller 180 to know whether touch input is generated or an area in which a touch is generated on the touch screen.

Further, the display unit 151 may include at least one of a liquid crystal display (LCD), a thin film transistor-LCD, an organic light-emitting diode, a flexible display, and a third-dimensional display. According to an implementation form of the mobile terminal 100, the mobile terminal 100 may have at least two display units 151. For example, the mobile terminal 100 may have both an external display unit (not shown) and an internal display unit (not shown).

In a call signal reception mode, a communication mode or a recording mode, a voice recognition mode, and a broadcasting reception mode, the sound output module 153 outputs audio data received from the RF unit 110 or stored in the memory 160. Further, the sound output module 153 outputs a sound signal related to a function performed in the mobile terminal 100, for example, a call signal reception sound, and a message reception sound. The sound output module 153 may include a speaker and a buzzer.

The alarm unit 155 outputs a signal notifying that an event is generated in the mobile terminal 100. The event generating in the mobile terminal 100 may include, for example call signal reception, message reception, and key signal input. The alarm unit 155 outputs a signal notifying generation of an event in other forms in addition to an audio signal or a video signal. For example, the alarm unit 155 may output a signal in a vibration form. When a call signal is received or a message is received, the alarm unit 155 may output a vibration in order to notify that a call signal is received or a message is received. Otherwise, when the key signal is input, the alarm unit 155 may output a vibration as the feedback to key signal input. A user can recognize whether an event is generated through such vibration output. A signal notifying generation of an event may be output through the display unit 151 or the sound output module 153.

The memory 160 may store a program for processing and controlling the controller 180 and perform a function for temporarily storing the input or output data (for example, a phonebook, a message, a still image, and a moving picture).

The memory 160 may include storage medium of at least one type of a flash memory type, a hard disk type, a multimedia card micro type, a card type memory (for example, SD or XD memory), a RAM, and a ROM. Further, the mobile terminal 100 may operate web storage for performing a storage function of the memory 160 on Internet.

The interface unit 170 performs an interface function of all external appliances connected to the mobile terminal 100. External appliances connected to the mobile terminal 100 may include, for example a wired/wireless head set, an external charger, a wired/wireless data port, a memory card, a card socket such as a subscriber identification module (SIM)/user identity module (UIM) card, an audio Input/Output (I/O) terminal, an video I/O terminal, and an earphone. The interface unit 170 receives data or power from the external appliances to transfer the data or the power to each of the elements within the mobile terminal 100 and transmits data within the mobile terminal 100 to external appliances.

The controller 180 generally controls an operation of each of the units and thus controls general operations of the mobile terminal 100. For example, the controller 180 performs a control and a processing related to audio dedicated communication, data communication, and audiovisual communication. Further, the controller 180 may include a multimedia reproduction module 181 for reproducing multimedia. The multimedia reproduction module 181 may be formed with hardware provided within the controller 180 or software in addition to the controller 180.

The power supply unit 190 receives an external power source and an internal power source by the control of the controller 180 to supply power necessary for operating each of the elements.

In the above description, the mobile terminal according to an exemplary embodiment of the present invention has described in an element viewpoint according to a function thereof.

Figure 2:
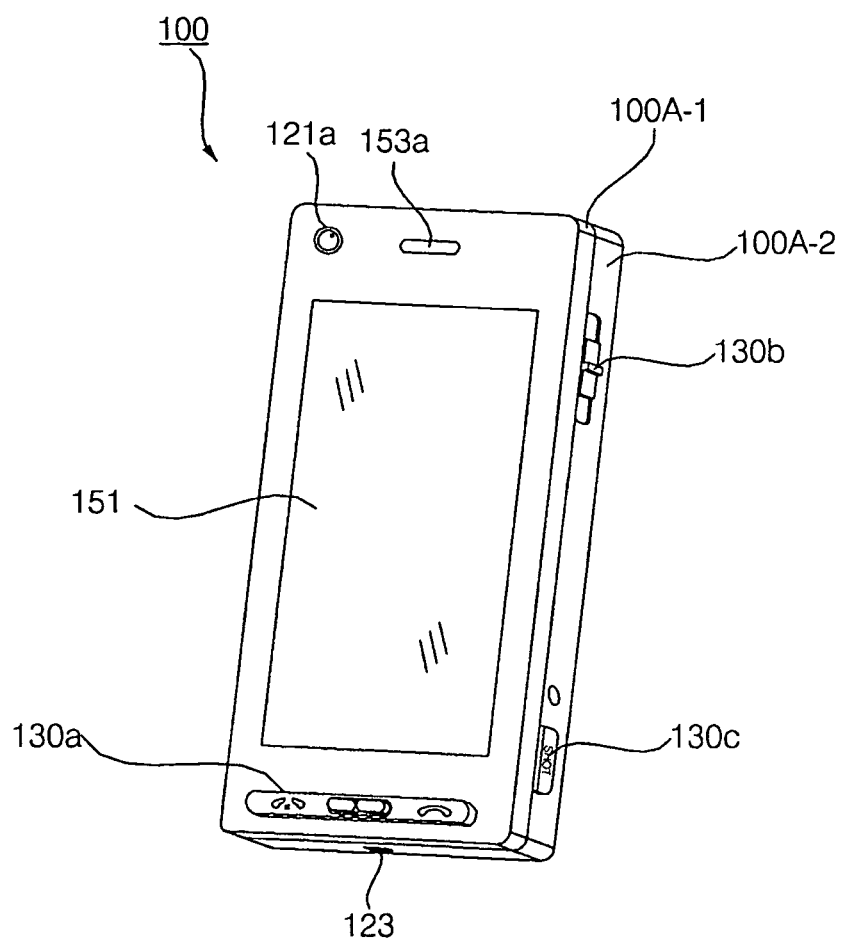
FIG. 2 is a perspective view of a front surface of a mobile terminal according to an exemplary embodiment of the present invention.
Figure 3:
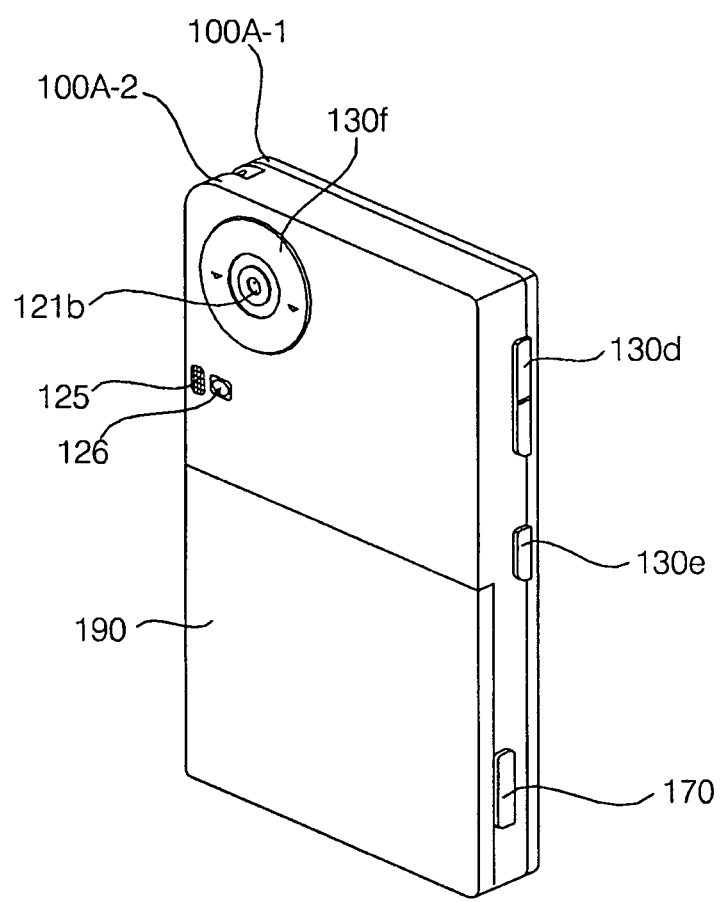
FIG. 3 is a perspective view of a rear surface of a mobile terminal according to an exemplary embodiment of the present invention.

Referring to FIGS. 2 and 3, the mobile terminal according to an exemplary embodiment of the present invention will be described hereinafter in an element viewpoint according to an external shape thereof. Among mobile terminals of several types such as a folder type, a bar type, a swing type, and a slider type, for convenience of description, a bar type mobile terminal in which an entire touch screen is provided is exemplified. However, the mobile terminal according to an exemplary embodiment of the present invention is not limited to the bar type mobile terminal and can be applied to all type mobile terminals including the above-described type.

FIG. 2 is a perspective view of a front surface of a mobile terminal according to an exemplary embodiment of the present invention.

Referring to FIG. 2, a case for forming an external appearance of the mobile terminal 100 is formed with a front case (100A-1) and a rear case (100A-2). Various electronic components are provided within space formed by the front case (100A-1) and the rear case (100A-2). Between the front case (100A-1) and the rear case (100A-2), at least one intermediate case may be additionally disposed. Such cases may be formed by injecting synthetic resin or be made of a metal material such as stainless steel (STS) or titanium (Ti).

In a main body, specifically in the first front case (100A-1), a display unit 151, a first sound output module 153a, a first camera 121a, and a first user input unit 130a may be disposed. In a side surface of the rear case (100A-2), a second user input unit 130b, a third user input unit 130c, and a microphone 123 may be disposed.

The display unit 151 includes a liquid crystal display (LCD) and Organic Light Emitting Diodes (OLED) for visually representing information. As touch pads are overlapped in a layer structure in the display unit 151, the display unit 151 operates as a touch screen, thereby inputting information by user touch.

The first sound output module 153a can be embodied in a form of a receiver or a speaker. The first camera 121a can be embodied to be suitable for photographing an image or a moving image of a user. The microphone 123 can be embodied in a form suitable for inputting the user voice and other sounds.

The first to third user input units (130a, 130b, and 130c) are referred to as a user input unit 130 and can use a tactile manner.

For example, the user input unit 130 can be embodied in a dome switch or a touch pad that receives an instruction or information by push or touch manipulation of the user, a wheel or jog scheme that rotates a key, or a manipulation scheme of a joy stick. In a functional aspect, the first user input unit 130a is used for inputting an instruction such as start, end, and communication and the second user input unit 130b is used for inputting selection of an operating mode. Further, the third user input unit 130c can be operated as a hot key for activating a special function within the mobile terminal 100.

FIG. 3 is a perspective view of a rear side of the mobile terminal shown in FIG. 2.

Referring to FIG. 3, a fourth user input unit 130d, a fifth user input unit 130d, and an interface unit 170 may be disposed in a side surface of the rear case (100A-2), and a second camera 121b may be additionally provided in a rear surface of the rear case (100A-2).

The second camera 121b has a photographing direction substantially opposite to the first camera 121a and may have a pixel different from that of the first camera 121a. For example, it is preferable that the first camera 121a has a low pixel in order to transmit the photographed user face to another party without a problem while photographing a user's face in a case of audiovisual communication and the second camera 121b has a high pixel because the second camera 121b generally photographs a general subject and does not directly transmit.

A sixth user input unit 130f may be provided around the second camera 121b. As the sixth user input unit 130f, a jog wheel for performing rotation input may be used.

A flashlight 125 and a mirror 126 may be additionally provided to be adjacent to the second camera 121b. When photographing a subject with the second camera 121b, the flashlight 125 throws light on the subject. When the user photographs (self photographing) himself using the second camera 12 lb, the mirror 126 is used to look at himself in the glass.

A second sound output module (not shown) may be additionally disposed in the rear case (100A-2). The second sound output module together with the first sound output module 153a can embody a stereo function and may be used for a communication in a speakerphone mode.

Further, in one side of the second rear case (100A-2), in addition to an antenna for a communication, a broadcasting signal reception antenna (not shown) is disposed. The antenna is provided to be withdrawn from the rear case (100A-2).

The interface unit 170 becomes a passage for allowing the mobile terminal 100 to exchange data with an external appliance. For example, the interface unit 170 may be at least one of a connection port for connecting to an earphone using a wire or radio, a port for local area communication, and a power supply terminal for supplying power to the mobile terminal 100. The interface unit 170 may be a card socket for housing an external card such as a SIM or an UIM, and a memory card for storing information.

The power supply unit 190 for supplying power to a mobile terminal is mounted at the rear case (100A-2) side. The power supply unit 190 may be, for example a chargeable battery and may be detachably coupled to the rear case (100A-2) for charging.

It is described that the second camera 121b is disposed in the rear case (100A-2), however a position of the second camera 121b is not always limited thereto. Further, although the second camera 121b is not separately provided, by rotatably forming the first camera 121a, the first camera 121 a may photograph a photographing direction of the second camera 121b.

Figure 4A:
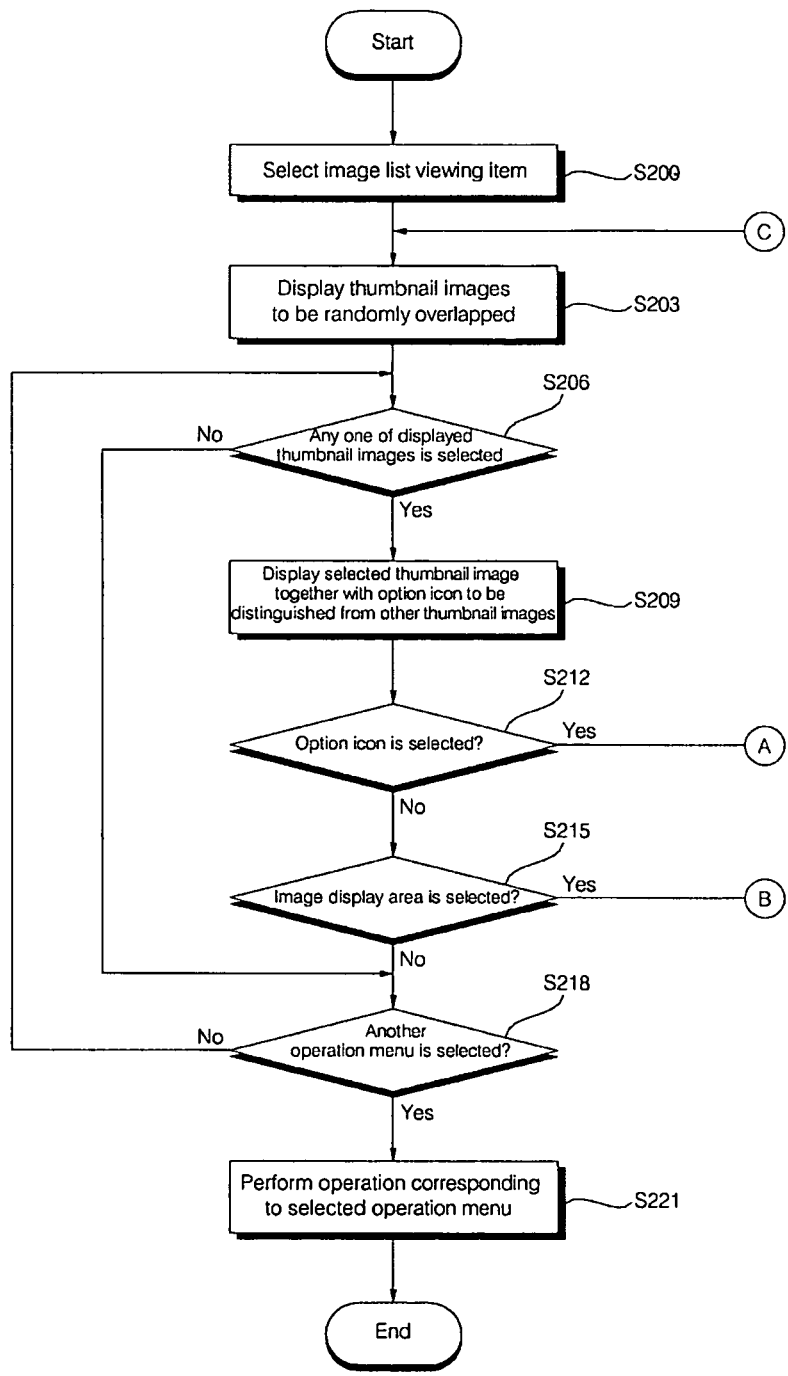
FIGS. 4A to 4C are flowcharts illustrating a method of controlling an operation of a mobile terminal according to an exemplary embodiment of the present invention.
Figure 4B:
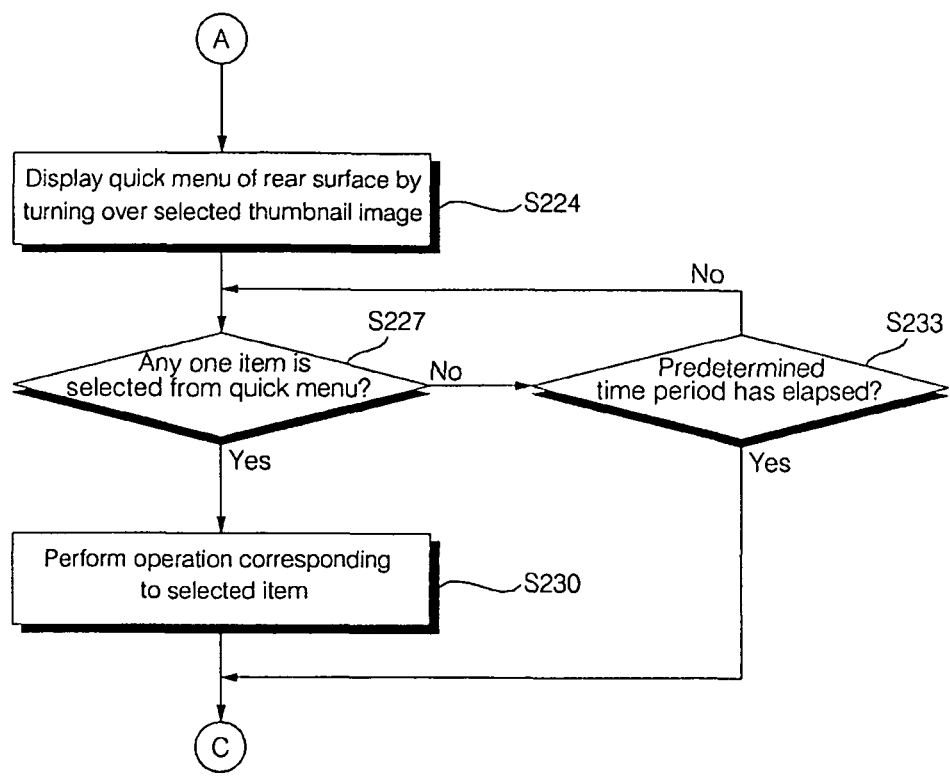
Figure 4C:
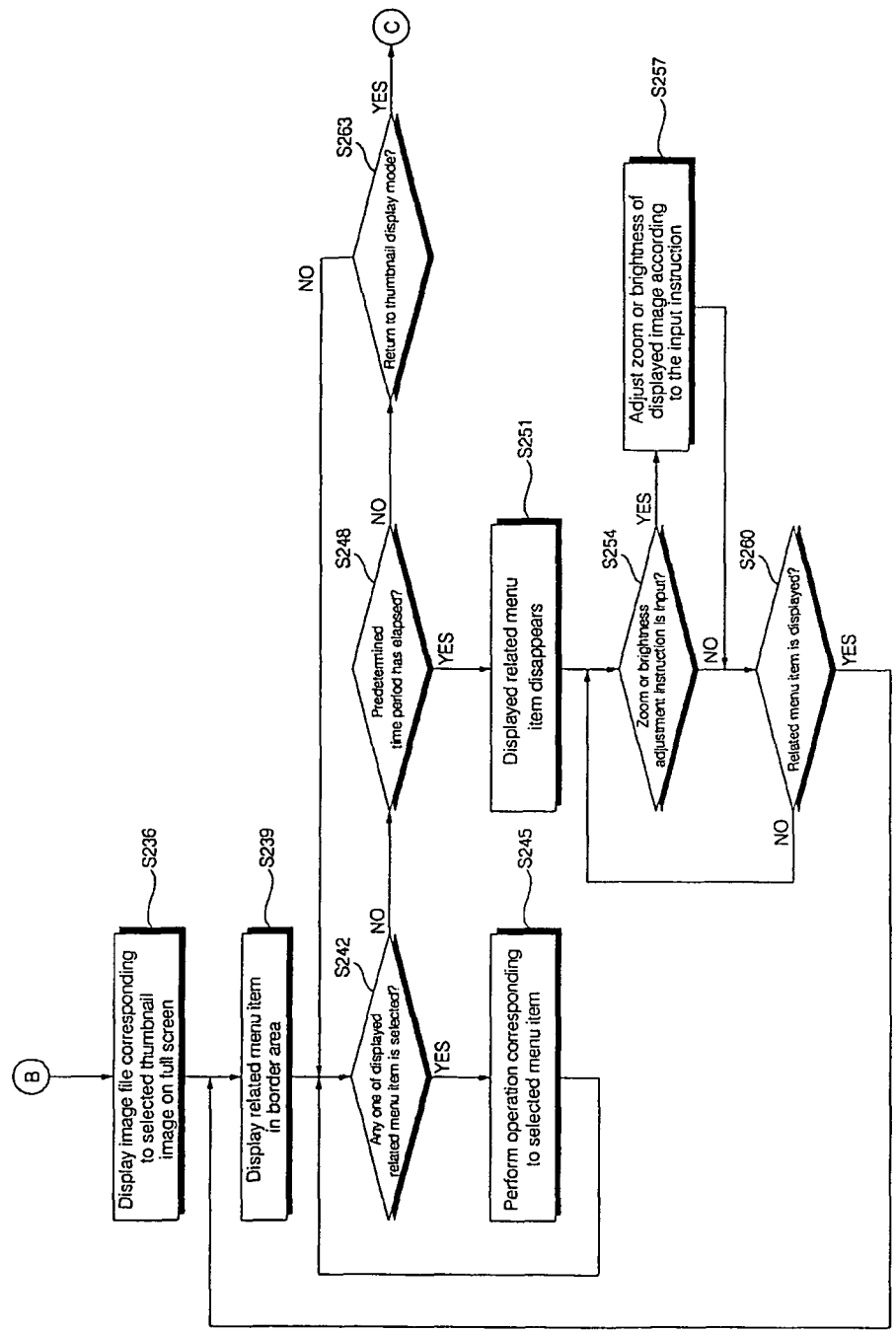

FIGS. 4A to 4C are flowcharts illustrating a method of controlling an operation of a mobile terminal according to an exemplary embodiment of the present invention.

Referring to FIG. 4A, when an image list viewing menu such as a photo album menu is selected by a user (S200), the controller 180 causes the display unit 151 to display a thumbnail image corresponding to an image file stored in the memory 160 to be randomly overlapped in the display unit 151 consisting of a touch screen or another screen (S203). By displaying the thumbnail image so that an overlapped area exists between displayed thumbnail images while randomly arranging whenever displaying the thumbnail image, many image lists can be displayed on one screen while providing a higher sense of reality.

In a state where thumbnail images are displayed so as to be randomly overlapped, the controller 180 determines whether any one of the displayed thumbnail images is selected (S206). If any one of the displayed thumbnail images is selected, the controller 180 causes the display unit 151 to display the selected image together with an option icon for selecting a quick menu to be distinguished from other thumbnail images (S209). Here, the quick menu is a menu for quickly entering a menu item such as transmission, edition, and deletion of an image file corresponding to the selected thumbnail image.

When the display unit 151 is formed with a touch screen, a desired thumbnail image can be selected by touch input. When the display unit 151 is not formed with a touch screen, a desired thumbnail image can be selected an alternative input such as tabbing or otherwise selecting. Further, by enlarging a size of the selected thumbnail image or differently displaying a circumferential edge of the selected thumbnail image, the selected thumbnail image can be displayed to be distinguished from other thumbnail images.

In a state where the thumbnail image is selected using such a method, the controller 180 determines whether an option icon is selected by a touch input (S212) or another input. If an option icon is selected by the touch input or the another input, the controller 180 causes the device to perform the process shown in FIG. 4B.

If an option icon is not selected by the touch input or the another input, the controller 180 determines whether an image display area is selected from the selected thumbnail image by touch input (S215). If an image display area is selected from the selected thumbnail image by the touch input or the another input, the controller 180 causes the device to perform the process shown in FIG. 4C.

The controller 180 determines whether another operation menu displayed in the display unit 151 except for the thumbnail image is selected (S218). If another operation menu displayed in the display unit 151 except for the thumbnail image is selected, the controller 180 controls to perform an operation corresponding to selected operation menu (S221).

FIG. 4B is a flowchart illustrating a process to be performed when an option icon is selected from the selected thumbnail image by a touch input or another input.

Referring to FIG. 4B, when an option icon is touched or otherwise selected, the controller 180 causes the display unit 151 to display a quick menu of a rear surface by turning over the selected thumbnail image (S224). The quick menu may include a menu item such as transmission, deletion, background setting, and edition of an image file corresponding to the selected thumbnail image.

The controller 180 determines whether any one item is selected from a quick menu (S227). If any one item is selected from a quick menu, the controller 180 causes the device to perform an operation corresponding to the selected item (S230).

If any one item is not selected from a quick menu, the controller 180 determines whether a predetermined time period has elapsed without a touch input (S233) or without another input. If a predetermined time period has elapsed without the touch input or the another input, the process returns to step S203.

FIG. 4C is a flowchart illustrating a process to be performed when an image display area in the selected thumbnail image is touched or is otherwise selected.

Referring to FIG. 4C, the controller 180 causes the display unit 151 to display an image file corresponding to the selected thumbnail image on a fall screen (S236).

The controller 180 causes the display unit 151 to display a related menu item in a border area such as a lateral side or a vertical side of an image displayed on a full screen (S239). In this case, the related menu item may include a menu item such as transmission, background setting, deletion, and edition of the displayed image.

The controller 180 determines whether any one of the displayed related menu item is selected (S242). If any one of the displayed related menu item is selected, the controller 180 causes the device to perform an operation corresponding to the selected menu item (S245).

If any one of the displayed related menu item is not selected, the controller 180 determines whether a predetermined time period has elapsed without a touch input or another input such as selection of a menu item (S248). If a predetermined time period has elapsed without the touch input or the another input, the controller 180 causes the device to remove the displayed related menu item (S251). Therefore, in this case, a related menu item is not displayed on a screen and only an image is displayed.

If a predetermined time period has not elapsed without the touch input or the another input at step S248, i.e. in a state where the related menu item is displayed, when the image display area is touched or otherwise selected, the process returns to step S203 (S263).

In a case where a related menu item disappears, the controller 180 determines whether a zoom or brightness adjustment instruction is input (S254). If a zoom or brightness adjustment instruction is input, the controller 180 causes the device to adjust a zoom or a brightness of a displayed image according to the input instruction (S257). In this case, the zoom or a brightness adjustment instruction can be input by dragging the selected image to any one of vertical and lateral directions after touching or otherwise selecting an image display area and zoom or brightness can be adjusted to correspond to a dragged distance.

If a zoom or brightness adjustment instruction is not input, the controller 180 determines whether a menu item is displayed (S260). If a menu item is displayed, the process returns to step S239. If a menu item is not displayed, the process returns to step S254.

Due to such a process, the stored image list can be displayed in a user friendly manner while providing a higher sense of reality and be quickly performed a desired operation related to the selected image. Further, the above-described exemplary embodiment exemplifies display of the stored image list, however the present invention can be applied to a case of displaying several images on a screen.

FIG. 4A shows an embodiment where procedure "B" (resulting from step S215) occurs if procedure "A" (resulting from step S212) is not performed. However, in an alternative embodiment, these procedures may be performed consecutively. For example, procedure "A" may be performed within procedure "B", and/or procedure "B" may be performed within procedure "A". Alternatively, the output of step S230 may be an input to steps S215 or S218, rather than step S203.

FIGS. 5 to 11 are screens illustrating a method of controlling an operation of a mobile terminal according to an exemplary embodiment of the present invention in a display unit.

Figure 5:
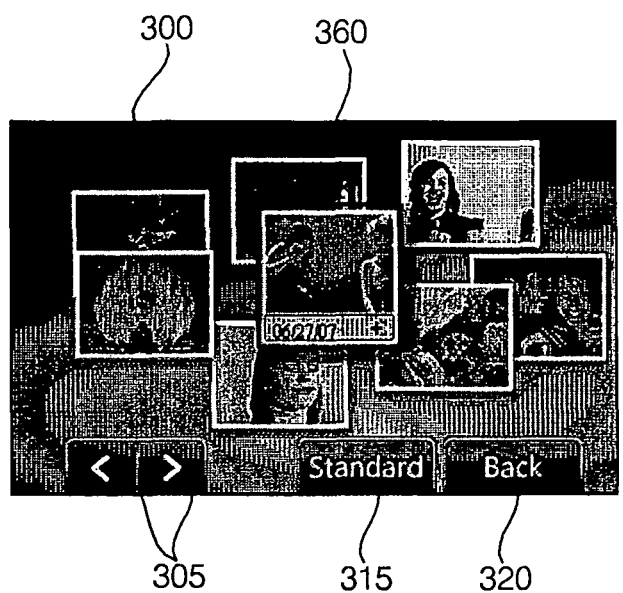
FIGS. 5 to 11 are screens illustrating a method of controlling an operation of a mobile terminal according to an exemplary embodiment of the present invention in a display unit.

FIG. 5 shows an example of an image list viewing screen 300 displayed when a photo album menu is selected. On the image list viewing screen 300, a thumbnail image corresponding to the stored image file is displayed to be randomly overlapped. When all of stored image lists cannot be displayed on one screen, at a lower end of the image list viewing screen 300 the following items are displayed: an icon 305 for moving to a next screen or a previous screen, a 'standard' menu item 315 for converting to a standard arrangement method, and a 'back' menu item 320 for moving to a previous menu.

In a display state where thumbnail images are randomly overlapped, when any one thumbnail image is selected by touch input, the thumbnail image together with an option icon is distinguishably displayed relative to the other thumbnail images, as indicated by reference numeral 360. The distinguishable display may include any of a time field (e.g., time of image creation, time of image storing, current time), the option icon, a border, or another visual identifier designed to alert a viewer that the thumbnail is a selected thumbnail.

Figure 6:
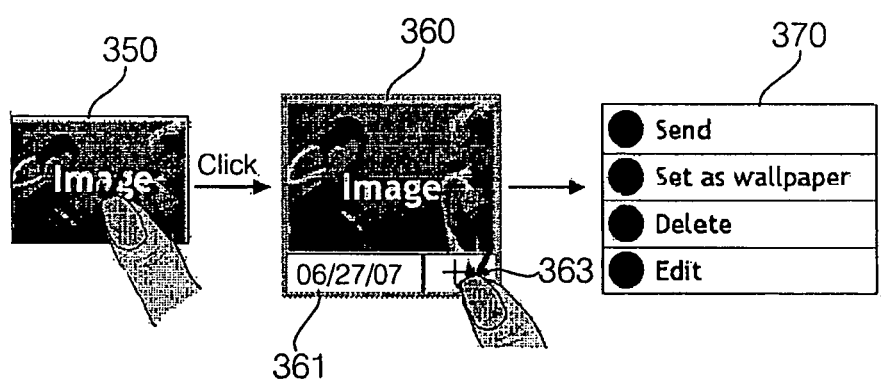

FIG. 6 is a diagram illustrating a process of converting the thumbnail image selected from the image list viewing screen 300.

Referring to FIG. 6, reference numeral 350 indicates a state before a thumbnail image is selected and reference numeral 360 indicates a state where a thumbnail image is selected. At a lower end of the selected thumbnail image 360, a date 361 in which an image is generated and an option icon 363 for selecting a quick menu are displayed. When the option icon 363 is selected by a touch input or another input, the selected thumbnail image is turned over by way of a controlled animation and a quick menu 370 is displayed (as if quick menu 370 is on a rear surface of image 360), as shown in FIG. 7.

Selected thumbnail image 360 may or may not be the same size as thumbnail image 350. The location of the center or edges of thumbnail image 360 may or may not differ from the location of the center or edges of selected thumbnail image 350.

Various animation techniques may be used to show the "turning over" on the screen. The image may rotate around a horizontal, vertical or diagonal axis. The image may rotate with a twisting or spinning action from one corner to another corner. Also, the "back side" of the image may be displayed via an alternative technique such as a flash, fade, circle open, circle close, a swipe, etc.

Figure 7:
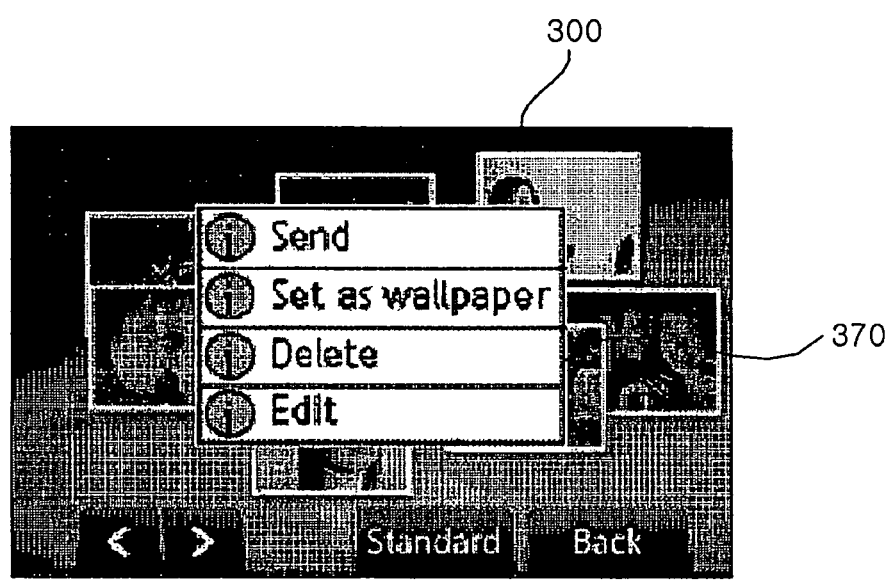

Also, quick menu 370 may be the same size as selected thumbnail image 360, or (as shown in FIG. 7) quick menu 370 may be a different (bigger or smaller) size than selected thumbnail image 360. In one embodiment, the center of quick menu 370 is located in the same, position as the center of selected thumbnail image 360. In other embodiments, the location of the center or edges of quick menu 370 may differ from the location of the center or edges of selected thumbnail image 360.

In another embodiment, information about the image may be displayed instead of or in addition to the quick menu 370. For example, the information may be meta data concerning an image source, an image creation time, an image subject, an image author/originator, an image size or pixel count, or other meta data about the image.

Figure 8:
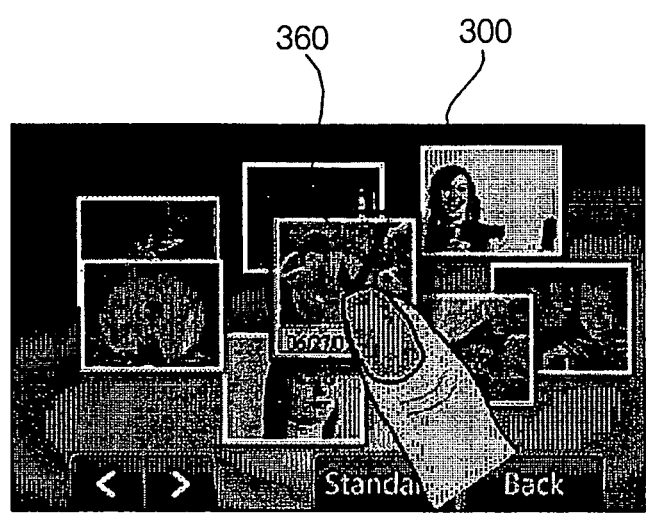

FIG. 8 illustrates a state in which an image display area of the thumbnail image 360 selected from the image list viewing screen 300 is selected by a touch input or via another input.

Figure 9:
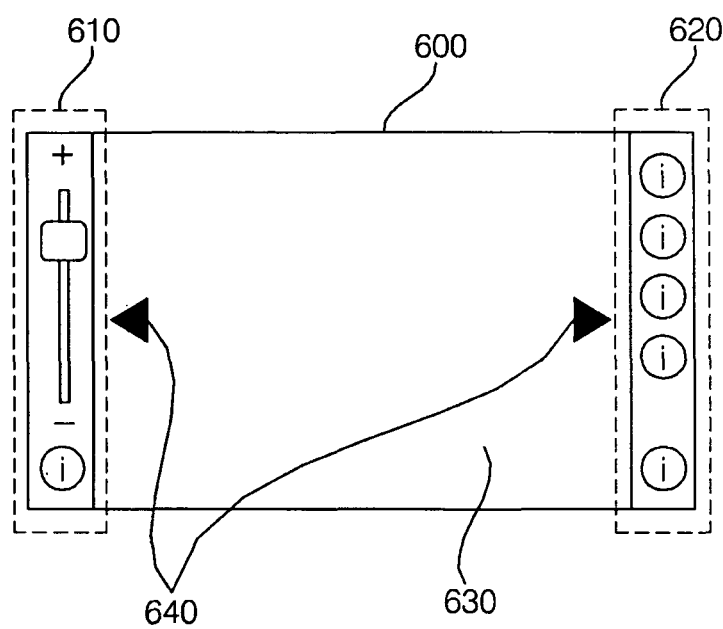

When the image display area of the selected thumbnail image is selected (e.g., via a touch to the image and/or via quick menu 370), the corresponding image file is displayed on a full screen, as shown in FIG. 9.

Control inputs 610 and 620 related to the displayed image are displayed at a lateral side of the image 600 displayed on the fall screen. Control input 620 includes one or more menu items such as menu items for image transmission, background setting, deletion, and editing. Control input 610 includes one or more slide bars for zooming or otherwise controlling (e.g., controlling the tilt, color, tint, special effects, etc) the image displayed in the display area 630. Controllers other than a slide bar (i.e., a rotary control image) may be displayed with or instead of the slide bar. Control input 610 may also include one or more menu icons in addition to, or in replacement of, the slide bar. In one embodiment, control inputs 610 and 620 disappear when there is no touch or other input for a predetermined time period. Further, when the image display area 630 is selected by a touch or other input, the screen is returned to the image list viewing screen 300. Control inputs 610 and 620 may be displayed on the right and left of display area 630, or vice versa. Alternatively, control inputs 610 and 620 may be displayed on above or below display area 630. Screen 600 also includes navigation icons 640 for navigating through plural images.

Figure 10:
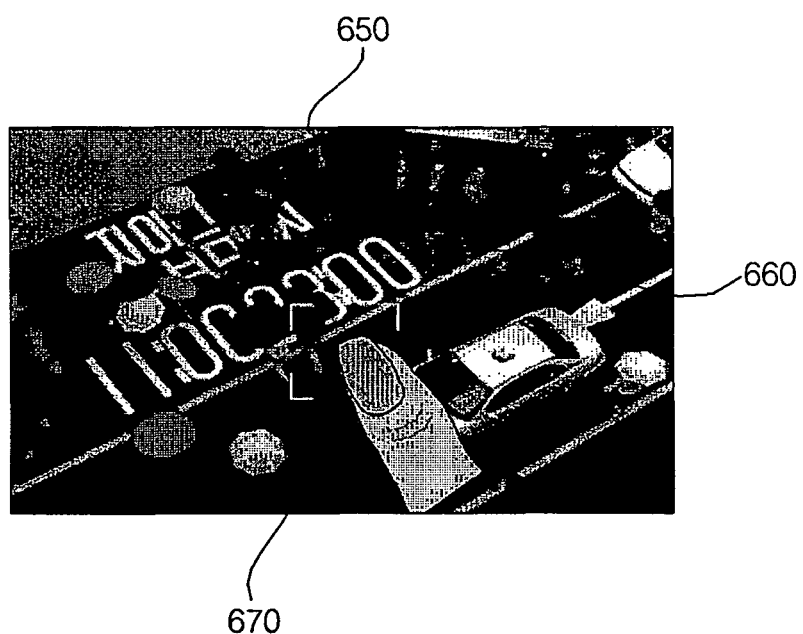

FIG. 10 illustrates a screen 650 where an image is displayed on a full screen, or on a major portion of the screen, in response to a user action (e.g., via a touch to the image or via quick menu 370). The image may be displayed on the full screen after a previously displayed related menu item has been removed from the screen. The displayed image may be touched or otherwise selected and dragged in a vertical direction (indicated by reference numeral 660) or dragged in a horizontal direction (indicated by reference numeral 670). As the image is dragged, brightness of the displayed image may be adjusted or a zoom setting may be adjusted in response to predetermined brightness or zoom display control settings. Alternatively, an image tint, focus, hue or other setting may be adjusted in response to predetermined display control settings.

Figure 11:
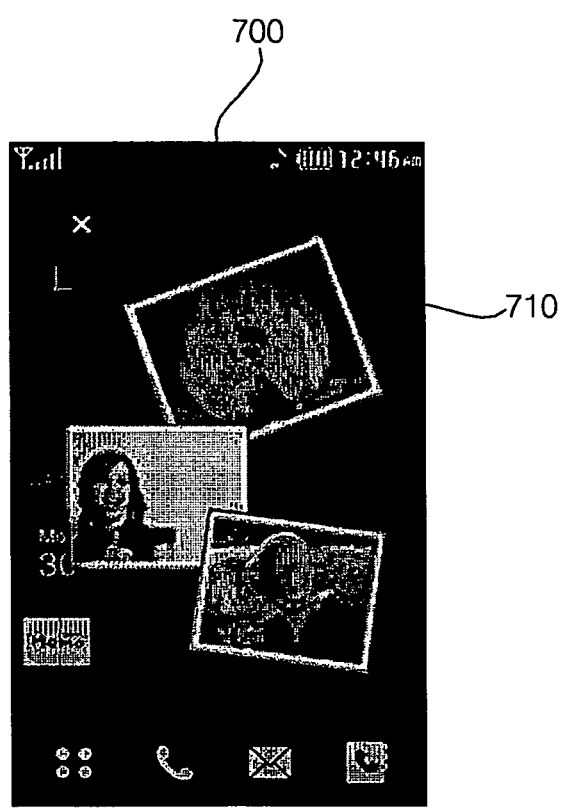

FIG. 11 shows a screen 700 in which a thumbnail image 710 previously selected from the image list viewing screen 300 is displayed as a background image in response to a touch input to menu 370 or another input. The thumbnail image selected from the image list viewing screen 300 can be used as various screen backgrounds and in this case, the thumbnail images can be displayed to be randomly overlapped.

The present invention can be implemented with processor readable codes in a processor readable recording medium provided in a mobile terminal such as a Mobile Station Modem (MSM). The processor readable recording medium may include all kinds of recording devices in which data that can be read by the processor are stored. The processor readable recording medium may include, for example a ROM, a RAM, a CD-ROM, a magnetic tape, a floppy disk, and an optical data storage device. In addition, the processor readable recording medium may also include implementations in the form of carrier waves (e.g. transmission via Internet). Further, the processor readable recording medium is distributed to a computer system connected to a network and the processor readable codes may be stored and executed therein in a distributed manner.

A mobile terminal and a method of controlling an operation thereof according to the present invention are not limited to a configuration and a method of the above-described exemplary embodiments but may be formed by a selective combination of all or some of each of the exemplary embodiments so that the exemplary embodiments may be variously deformed.

Figure 12:
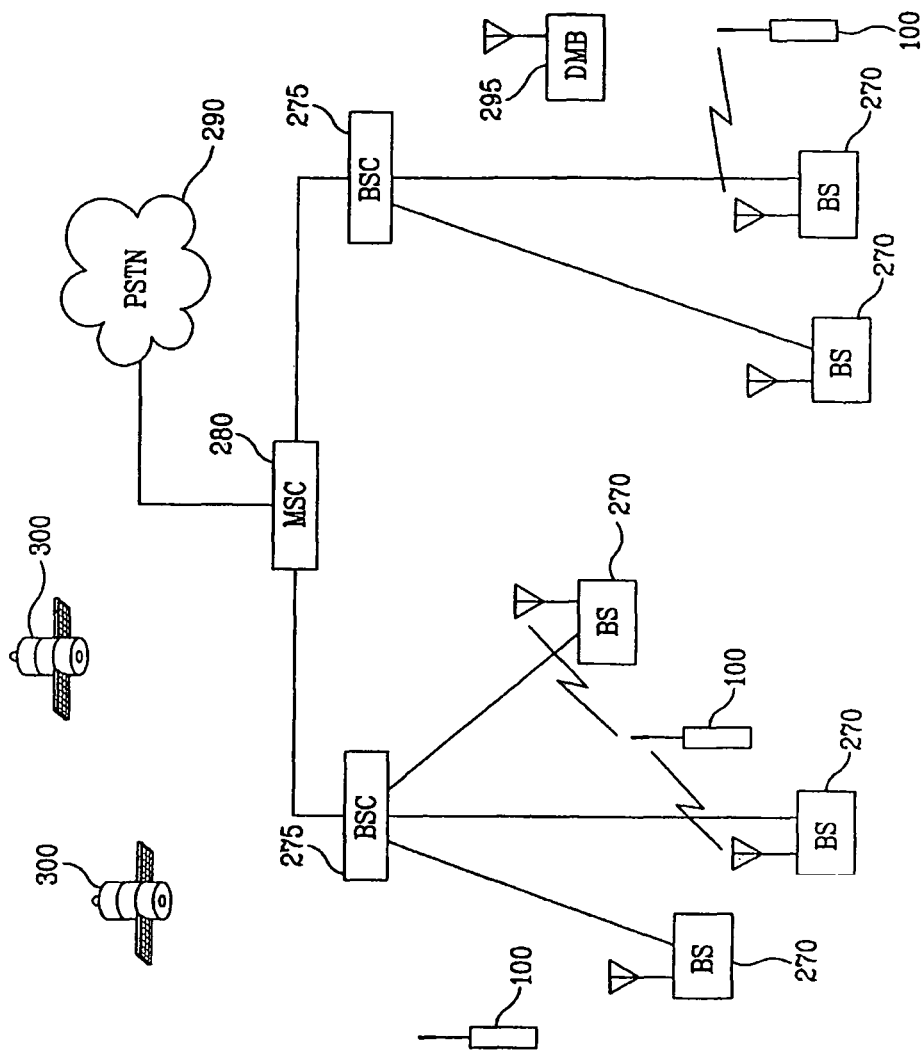
FIG. 12 is a description of a wireless network that may be accessed with one or more of the embodiments described herein.

FIG. 12 shows an exemplary network that may be accessed by one of the preceding embodiments. The network includes several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Examples of such air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM).

Indeed, the preceding method(s) may be practiced on the device shown in FIGS. 2-3, or may be practiced on other related mobile terminals (e.g., mobile terminals that include a flip screen/panel or a sliding handset.) Also, the input may not be a touch input. Instead, a tab action, roller ball action, joystick action or key selection may be used in place of the above described touch inputs.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller.

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

As described above, according to the present invention, by displaying a thumbnail image corresponding to an image file stored in a touch screen to be randomly overlapped, an image file stored in a user friendly manner can be easily searched. Further, it is possible to quickly and easily approach to a related menu by an intuitional touch input of a thumbnail image displayed on the touch screen, thereby improving user convenience.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling an operation of a mobile communication device equipped with a touch screen, the method comprising:
   displaying on the touch screen a plurality of thumbnail images, each thumbnail image corresponding to an image file stored in the mobile communication device, the plurality of thumbnail images overlapped on the touch screen;
   selecting a first thumbnail image located at a first position on the touch screen in response to a touch input to the first thumbnail image;
   displaying the selected first thumbnail image in a manner to be distinguished from other thumbnail images of the plurality of thumbnail images by placing an icon for initiating a
   display of a menu on an icon display area of the selected first thumbnail image;
   one of
      (a) in response to a touch to the icon,
         displaying a turning over of the first thumbnail image with the icon to display the menu on a reverse side of the turned over first thumbnail image, a size of the displayed menu being larger than a size of the first thumbnail image, and
         automatically redisplaying the first thumbnail image if a touch input is not detected on the menu within a first predetermined time after displaying the menu; and
      (b) if there is no touch to the icon,
         displaying a first image and first image control icons corresponding to the first thumbnail image on a full screen of the touch screen when a touch input is detected in an image display area of the first thumbnail image, the first image control icons being located on at least one vertical border area of the touch screen, and
         automatically removing the first image control icons from the touch screen if a touch input is not detected on the first image control icons within a second predetermined time after displaying the first image control icons, while maintaining the first image on the touch screen; and
   adjusting a brightness of the first image in response to a user input of touching and dragging in a predetermined direction on the first image while the first image is displayed, the brightness of the first image being adjusted in proportion to a dragged distance.

2. The method of claim 1, the step of displaying the selected first thumbnail image with an icon comprising:
   displaying the first thumbnail image with the icon together with the plurality of thumbnail images.

3. The method of claim 2, the step of displaying the selected first thumbnail image with an icon with the plurality of thumbnail images comprising one of:
   enlarging and displaying the first thumbnail image with the icon in a second position on the touch screen; and
   displaying the first thumbnail image with the icon in a second position on the touch screen without enlarging the first thumbnail image.

4. The method of claim 3, wherein the second position comprises one of:
   a position substantially centered on the touch screen; and
   a position substantially centered on a center point of the first position.

5. The method of claim 1, wherein the step of displaying the menu comprises:
   displaying at least one of an image transmission menu item, an image deletion menu item, a send-to-background menu item, and an image edit menu item.

6. The method of claim 5, the step of displaying at least one of an image transmission menu item, an image deletion menu item, a send-to-background menu item, and an image edit menu item comprising:
   displaying the send-to-background menu item; and
   displaying the first image corresponding to the first thumbnail image as a background image on the touch screen in response to a touch input to the send-to-background menu item.

7. The method of claim 1, wherein the step of displaying the selected first thumbnail image comprises:
   displaying date information corresponding to when an image generation date in addition to the icon on a lower end of the selected thumbnail image.

8. The method of claim 7, the step of displaying the first image control icons comprising:
   displaying a plurality of menu icons on a first vertical border of the touch screen; and
   displaying one of a menu icon and a control bar on a second vertical border of the touch screen.

9. The method of claim 8, wherein the step of displaying one of a menu icon and a control bar comprises:
   displaying the control bar on the second vertical border of the touch screen, the control bar configured to perform one of a corresponding first image zoom function and a corresponding first image quality adjustment function.

10. The method of claim 1, further comprising one of:
    adjusting an image quality of the first image in response to a first drag input to the first image; and
    zooming in or out of the first image in response to a second drag input to the first image.

11. The method of claim 1, wherein the step of displaying on the touch screen a plurality of thumbnail images comprises:
    determining whether or not thumbnails for all images stored in the mobile communication device can be displayed in the plurality of thumbnail images; and
    if thumbnails for all stored image files cannot be displayed in the plurality of thumbnail images, displaying one of forward and back movement icons with the plurality of thumbnail images, the forward and back movement icons used to replace at least one displayed thumbnail image with another thumbnail image.

12. A mobile communication device, comprising:
    a touch screen; and
    a controller operatively connected to the touch screen and configured to display a plurality of thumbnail images on the touch screen, each thumbnail image corresponding to an image file stored in the mobile communication device, display an icon with the plurality of thumbnail images, the icon used to display other thumbnail images which are not displayed on the touch screen, select a first thumbnail image from the plurality of thumbnail images in response to a touch input to the first thumbnail image, display the selected first thumbnail image in a first manner to be distinguished from other thumbnail images of the plurality of thumbnail images by differently displaying an edge of the selected first thumbnail image, display a first image corresponding to the selected first thumbnail image and control icons on a full screen of the touch screen after the selected first thumbnail image is displayed in the first manner to be distinguished from the other thumbnail images, the control icons being located on at least one border of the touch screen, automatically remove the control icons from the touch screen if a touch input is not detected on the control icons within a predetermined time after displaying the control icons, while maintaining the first image on the full screen of the touch screen, set the selected first thumbnail image as a background of a current wallpaper image in response to a touch input to the displayed control icons, generate a new wallpaper image by combining the current wallpaper and a plurality of thumbnail images set as the background, and display the new wallpaper image on the touch screen in response to a predetermined user input, the plurality of thumbnail images being overlapped on the touch screen.

13. The mobile communication device of claim 12, wherein the controller is configured to display the selected first thumbnail image in a second manner to be distinguished from the other thumbnail images by enlarging a size of the selected thumbnail image.

14. The mobile communication device of claim 12, wherein the controller is configured to
display a plurality of menu icons on a first vertical border of the touch screen, and
display one of a menu icon and a control bar on a second vertical border of the touch screen.

15. The mobile communication device of claim 14,
wherein the controller is configured to display the control bar on the second vertical border of the touch screen, and
wherein the control bar is configured to perform one of a corresponding first image zoom function and a corresponding first image quality adjustment function.

16. The mobile communication device of claim 12, wherein the controller is configured to perform one of:
adjust an image quality of the first image in response to a first drag input to the first image, and
zoom in or out of the first image in response to a second drag input to the first image.

17. The mobile communication device of claim 12, wherein the controller is configured to display the plurality of thumbnail images in response to a user input to the mobile communication device.

18. The mobile communication device of claim 12, wherein the controller is configured to
determine whether or not thumbnail images for all images stored in the mobile communication device can be displayed on the touch screen, and
if thumbnail images for all stored image files cannot be displayed on the touch screen, display one of forward and back movement icons with the plurality of thumbnail images, the forward and back movement icons being used to display other thumbnail images which are not displayed on the touch screen.

19. The mobile communication device of claim 12, wherein the control icons comprise at least one of an image transmission menu item, an image deletion menu item, a send-to-background menu item, and an image edit menu item.

20. A mobile communication device, comprising:
a touch screen; and
a controller operatively connected to the touch screen and configured to
display on the touch screen a plurality of thumbnail images, each thumbnail image corresponding to an image file stored in the mobile communication device, the plurality of thumbnail images overlapped on the touch screen;
select a first thumbnail image located at a first position on the touch screen in response to a touch input to the first thumbnail image;
display the selected first thumbnail image in a manner to be distinguished from other thumbnail images of the plurality of thumbnail images by placing an icon for initiating a display of a menu on an icon display area of the selected first thumbnail image;
one of
(a) in response to a touch to the icon,
display a turning over of the first thumbnail image with the icon to display the menu on a reverse side of the turned over first thumbnail image, a size of the displayed menu being larger than a size of the first thumbnail image, and
automatically redisplay the first thumbnail image if a touch input is not detected on the menu within a first predetermined time after displaying the menu; and
(b) if there is no touch to the icon,
display a first image and first image control icons corresponding to the first thumbnail image on a full screen of the touch screen when a touch input is detected in an image display area of the first thumbnail image, the first image control icons being located on at least one vertical border area of the touch screen, and
automatically remove the first image control icons from the touch screen if a touch input is not detected on the first image control icons within a second predetermined time after displaying the first image control icons, while maintaining the first image on the touch screen; and
adjust a brightness of the first image in response to a user input of touching and dragging in a predetermined direction on the first image while the first image is displayed, the brightness of the first image being adjusted in proportion to a dragged distance.

\* \* \* \* \*